(12) United States Patent
Hua et al.

(10) Patent No.: US 8,116,346 B2
(45) Date of Patent: Feb. 14, 2012

(54) $CO_2$ LASER OUTPUT POWER CONTROL DURING WARM-UP

(75) Inventors: Gongxue Hua, Unionville, CT (US); Lanny Laughman, Bolton, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 12/752,266

(22) Filed: Apr. 1, 2010

(65) Prior Publication Data
US 2011/0182319 A1    Jul. 28, 2011

Related U.S. Application Data

(60) Provisional application No. 61/297,638, filed on Jan. 22, 2010.

(51) Int. Cl.
*H01S 3/22* (2006.01)
(52) U.S. Cl. .......... 372/55; 372/29.013; 372/38.05; 372/87
(58) Field of Classification Search .......... 372/55, 372/29.013, 38.05, 87
See application file for complete search history.

(56) References Cited

U.S. PATENT DOCUMENTS

| | | | |
|---|---|---|---|
| 3,624,542 | A | 11/1971 | Pugh, Jr. |
| 4,429,392 | A | 1/1984 | Yoshida et al. |
| 4,443,877 | A | 4/1984 | Chenausky et al. |
| 4,977,573 | A | 12/1990 | Bittenson et al. |
| 5,150,372 | A | 9/1992 | Nourrcier |
| 5,710,787 | A | * 1/1998 | Amada et al. ............ 372/25 |
| 6,021,150 | A | 2/2000 | Partio et al. |
| 6,034,978 | A | 3/2000 | Ujazdowski et al. |
| 6,181,719 | B1 | 1/2001 | Sukhman et al. |
| 7,061,417 | B2 | 6/2006 | Chin |
| 7,161,434 | B2 | 1/2007 | Rhodes |
| 7,164,703 | B2 | 1/2007 | Paetzel |
| 7,265,619 | B2 | 9/2007 | Tayrani |
| 7,312,668 | B2 | 12/2007 | Li et al. |
| 7,327,300 | B1 | 2/2008 | Agarwal et al. |
| 2003/0001686 | A1 | 1/2003 | Sekiya |
| 2004/0017603 | A1 | 1/2004 | Jay et al. |
| 2005/0271096 | A1 * | 12/2005 | Zeleny et al. ............ 372/29.011 |
| 2008/0204134 | A1 | 8/2008 | Knickerbocker et al. |

(Continued)

FOREIGN PATENT DOCUMENTS

JP    64-005084    *    1/1989

OTHER PUBLICATIONS

Non Final Office Action received for U.S. Appl. No. 12/478,393, mailed on May 27, 2010, 13 pages.

(Continued)

*Primary Examiner* — Tod T Van Roy
(74) *Attorney, Agent, or Firm* — Morrison & Foerster LLP

(57) ABSTRACT

A $CO_2$ gas discharge laser includes a housing enclosing spaced-apart electrodes and a lasing gas. A laser resonator extends between the spaced-apart electrodes. An RF power supply provides RF power for creating a discharge in the lasing gas, causing laser radiation to be delivered by the laser resonator. The power of the output radiation is directly dependent on the RF power provided to the electrodes and inversely dependent of the temperature of the gas discharge. A signal representative of the discharge-temperature is used to adjust the RF power supplied to the electrodes such that the power of the output radiation is about constant.

16 Claims, 8 Drawing Sheets

U.S. PATENT DOCUMENTS

2008/0240183 A1    10/2008    Newman et al.
2009/0296764 A1    12/2009    Robotham et al.

OTHER PUBLICATIONS

Notice of Allowance received for U.S. Appl. No. 12/478,393, mailed on Sep. 28, 2010, 6 pages.

U.S. Appl. No. 12/749,781, filed Mar. 20, 2010, by David John Allie, entitled "Digital Pulse-Width-Modulation Control of a Radio Frequency Power Supply for Pulsed Laser," 18 pages in length.

International Search Report and Written Opinion received for PCT Patent Application No. PCT/US2010/051819, mailed on Jun. 6, 2011, 13 pages.

Juan et al., "Study on Pulse Width Modulation of RF Excited CO2 Laser", Proc. of SPIE, vol. 7515, 2009, pp. 75150N-1-75150N-9.

Bo et al., "Control System of an Excitation Power Supply for Fast Axial Flow CO2 Lasers", Proc. of SPIE, vol. 7515, 2009, pp. 751505-1-751505-6.

Pearsica et al., "Discharge Current Modulation to Obtain the Pulse Operation of a Power CO2 Laser, with Continuous Flow of the Gas", IEEE, 2007, pp. 561-565.

Fan et al., "PPMPWM: a new modulation format for wireless optical communications", IEEE, 2010, pp. 604-609.

* cited by examiner

CO₂ LASER OUTPUT POWER CONTROL DURING WARM-UP

PRIORITY CLAIM

This application claims priority of U.S. Provisional Application No. 61/297,638, filed Jan. 22, 2010, the complete disclosure of which is hereby incorporated by reference.

TECHNICAL FIELD OF THE INVENTION

The present invention relates in general to carbon-dioxide ($CO_2$) gas-discharge lasers. The invention relates in particular to controlling power output of such lasers.

DISCUSSION OF BACKGROUND ART

Diffusion cooled, radio frequency (RF) pulsed $CO_2$ gas discharge lasers driven by a radio frequency power supply (REPS) are used extensively for laser processing applications such as cutting, drilling, scribing, fusing, marking, heat treating, and engraving. For many of these applications, good pulse-to-pulse amplitude stability of the output power of the lasers is required. Power output stability from a cold start of better than 3% is a typical specification while a 1% requirement is becoming more common.

While power control methods have been developed to achieve such specifications during a steady state operation, it has been found that there is a "warm-up" period following a cold start after a long period of inactivity, prior to reaching steady-state operation, where the laser-output power rises significantly above the controlled steady-state level. There is also a measurable power rise after a relatively short period of inactivity. This reduces the usefulness of the laser during that warm-up period.

One example of a power rise during warm up is depicted graphically in FIG. 1. In this example, a pulsed 346 Watt (W) output power RF excited slab $CO_2$ laser was operated at a pulse repetition frequency (PRF) of 5 kilohertz (kHz) with pulses of 30 microseconds (μs) duration. In FIG. 1 the measured output power as a function of time is schematically depicted after the laser had been restarted after being turned off for a period of only 30 seconds. The laser used a temperature controlled closed cycle chiller to minimize the laser's steady state output power variations with temperature. The laser power was 376 W approximately 0.5 minutes after turn on. The power dropped to 350 W after approximately 6 minutes and then gradually dropped down to 346 W steady state approximately 16 minutes after turn-on. The percentage of output power variation was approximately 7.5% 6 minutes after turn or, and 8.7% 16 minutes after turn on. As the laser turn off time was increased, the percentage drop in the output power after restart increased.

It was determined by calculation and experiment that the power-rise during warm up could be attributed to a lower-than-steady-state temperature of the discharge gas at the instant of turn on of the laser after even a relatively short period of inactivity. The output power of $CO_2$ diffusion cooled lasers decreases as their gas temperature increases. It was determined that prior to being turned on after being off for seconds or longer, the gas temperature was low enough to account for the sharp rise of output power during warm-up to the steady state operating temperature. It was calculated that the power output drops by about 0.6% per degree C. with increasing temperature. As the gas heats up after turn on, the output power of the laser drops and eventually reaches a steady state value.

A diffusion-cooled $CO_2$ laser is a gas discharge laser in which cooling of the discharge occurs by having a relatively small separation between parallel cooled electrodes between which the discharge is formed when RF power is applied to the electrodes. For lasers having an output larger than about 70 W, the electrodes are usually cooled by flowing a liquid coolant through cooling lines in contact with the electrodes, or through drilled passages within the electrodes.

The separation between the electrodes is intentionally sufficiently small in order to provide a high probability that excited state $CO_2$ molecules residing in a relatively long-lifetime "010" bending vibration state (a non-lasing state that is located only marginally above the ground state), can collide with the liquid cooled electrode surfaces. This collision process depopulates the "010" state, thereby cooling the gas during discharge. The depopulation of the "010" lower level increases the population inversion between two "lasing" levels. This results in higher laser output power and efficiency.

Providing effective cooling of the electrodes and, accordingly, the laser discharge, is important in order to obtain good laser output efficiency from diffusion cooled, hermetically sealed, RF excited $CO_2$ lasers. For demanding laser material processing applications, temperature controlled closed cycle chillers are used to minimize steady state output power variations with discharge temperature. It is believed that this cooling is sufficiently effective that the lasing gas temperature can drop significantly even after only a relatively short period such as the 30 seconds in the example of FIG. 1. It is believed also that this effectiveness of the cooling is also responsible for the relatively long period required for warm-up to steady state operation.

Continued discussion of this assumed mechanism for high power during warm-up is set forth below with reference to the graphs of FIGS. 2A, 2B, and 2C. Before discussing the graphs in detail, however, it is useful to briefly discuss the mechanism by which RF electrodes are typically driven.

Typically the electrodes are driven by an RFPS that is powered by a DC power supply. In simple terms, the RF power supply "converts" DC voltage supplied by the DC power supply to a corresponding RF voltage, and the converted RF voltage is amplified in the RFPS to a level sufficient to drive the electrodes with a power sufficient to provide a desired laser output power. Laser manufacturers usually make use of commercially produced DC power supplies to gain lower cost from the increased volume whereas they usually design and build (or have built) RF power supplies appropriate for a particular laser family.

The design of modern, diffusion-cooled RF-excited $CO_2$ lasers is such that once steady-state output power has been established there will be little unintended variation (fluctuation) of that output power. This is fortunate as closed loop RF power control arrangements for stabilizing output are either impractical or expensive. A desired increase or decrease in steady state output is usually provided by pulse-width modulation means. This involves respectively increasing or decreasing output pulse duration while maintaining a fixed PRF for the output pulses.

FIG. 2A is a graph of RF power applied to electrodes as a function of time. The RF power ($P_{HL}$) represented can be either continuous or in the form of a continuous pulse train having a PRF anywhere from about 100 (Hertz) Hz up to 200 kHz. This makes no difference to the analysis. At time $t_0$, the power is turned on after an assumed long period of inactivity. At an arbitrary time $t_2$, the RF power is turned off. At a time $t_3$ the RF power is turned back on again. The inactivity period ($t_3-t_2$), here, is assumed to be shorter than the inactivity period preceding time $t_0$.

FIG. 2B schematically illustrates discharge (lasing gas) temperature as a function of time corresponding to the RF power application as a function of time depicted in FIG. 2A. At time $t_0$, the temperature $T_C$ of the lasing gas the discharge electrodes is equal to the temperature of the electrodes, typically about 23° C. for cooled electrodes. As soon as a discharge is lit, the lasing gas temperature begins to rise. The lasing gas temperature reaches a steady state temperature, $T_H$ at time $t_1$. When the RF power is turned off at time $t_2$, the lasing gas temperature begins to fall, reaching a temperature $T_C'$ at time $t_3$. Here it is assumed that the turn-off period ($t_2$-$t_3$) is sufficiently shorter than the original turn-off period (before $t_0$) that $T_C'$ is greater than $T_C$. At time $t_3$ the RF power is turned back and the gas temperature begins to increase again. At time $t_4$, the gas temperature again reaches steady state temperature $T_H$.

FIG. 2C is a graph schematically illustrating laser output power as a function of time under the RF power and gas-temperature conditions of FIGS. 2A and 2B. At time $t_0$, the gas is the coolest and the laser output power accordingly is the highest with a value designated as $P_C$. As the gas heats up, the laser power drops until a steady state value $P_H$ is reached at time $t_1$. At time $t_2$, the RF power is turned off by a user's command signal which quickly turns off the laser output power. The RF power is again turned on at $t_3$, At his time the discharge temperature has only fallen to a vale $T_C'$ (see FIG. 2B) which is higher than the value $T_C$ at $t_0$. Because of this, the laser power rises only to a value $P_C'$, which is not as high as $P_C$. At time $t_4$, the laser power again reaches steady state $P_H$.

For demanding laser material processing applications, such output power variation after restarting is inconvenient. Accordingly, there is a need to mitigate if not altogether eliminate the power rise during the warm-up period.

SUMMARY OF THE INVENTION

In one aspect, a gas discharge laser comprises a housing including spaced-apart electrodes and a lasing gas. A laser resonator extends between the spaced-apart electrodes. An RF power supply is arranged to provide RF output power to the electrodes for creating a discharge it the lasing gas between the electrodes thereby causing laser output radiation to be delivered by the laser resonator. The power of the laser output radiation is directly dependent on the RF power provided to the electrodes. An arrangement is provided for producing a signal representative of the temperature of the gas discharge, the power of the laser output radiation being inversely dependent on the temperature of the gas discharge. An arrangement is provided responsive to the gas discharge temperature signal for adjusting the output power of the RF power supply responsive to changes in the gas discharge temperature such that the power of the output radiation is about constant.

In another aspect of the subject invention, a method of operating an RF gas discharge laser is disclosed. The laser is of the type which includes a pair of electrodes and a lasing gas located within a housing. The laser further includes an RF power supply for supplying RF power to the electrodes to excite the lasing gas to create a discharge between the electrodes. The method comprises the steps of monitoring the temperature of the gas discharge and adjusting the level of RF power supplied to the electrodes in response to the monitored temperature in a manner to reduce fluctuations in output power.

DETAILED DESCRIPTION OF THE INVENTION

Figure 3:
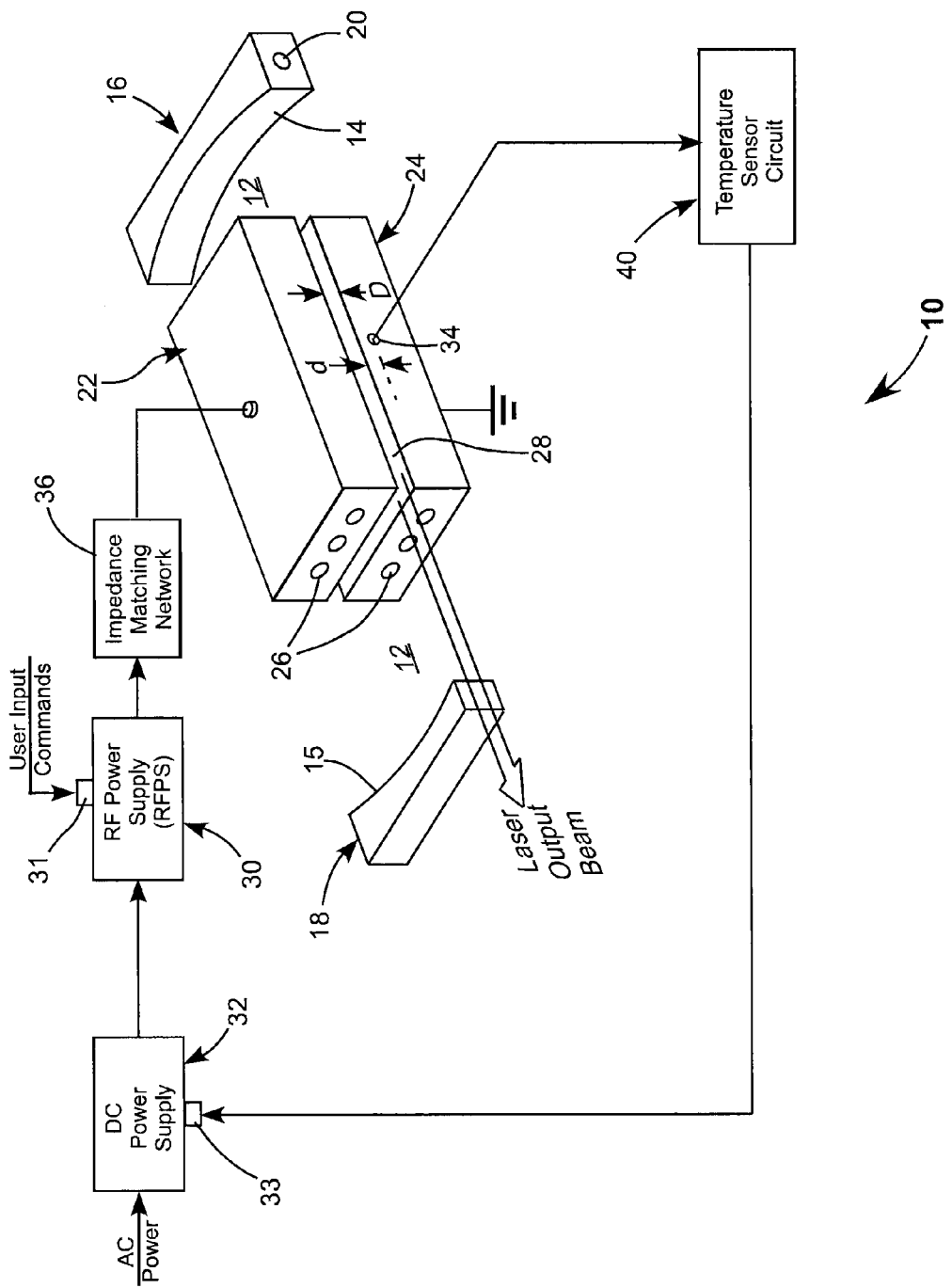
FIG. 3 schematically illustrates one preferred embodiment of gas discharge laser apparatus in accordance with the present invention including spaced-apart parallel discharge electrodes, an RF power supply driven by a variable output voltage DC power supply for providing RF power to the electrodes for igniting a gas discharge therebetween, and a temperature sensor and electronic circuitry for monitoring the temperature of the gas discharge, the temperature sensor electronics cooperative with the DC power supply for varying the RF power to the discharge as a function of the monitored temperature.

Continuing with reference to the drawings, wherein like features are designated by like reference numerals, FIG. 3 schematically illustrates one preferred embodiment 10 of a gas discharge laser apparatus in accordance with the present invention. Laser 10 includes a laser resonator 12 formed between reflective surfaces 14 and 15 of mirrors 16 and 18 respectively. This resonator is a negative branch unstable resonator with mirror 18 being the outcoupling mirror of the resonator. The laser output beam bypasses the outcoupling mirror as indicated in the drawing, and as is known in the art. The mirrors can be fluid cooled, for example, by passing a cooling fluid through a channel in the mirrors as indicated by cooling channel 20 in mirror 16.

The laser resonator passes between spaced-apart parallel electrodes 22 and 24. Electrode 22 in this instance is connected to an RF power supply 30 (via an impedance matching network 36) and can be designated the hot electrode. Electrode 24 is connected to ground. As discussed above, the electrodes in this type of laser are typically fluid cooled. Here, channels 26 extend through the electrodes to facilitate such fluid cooling. The electrodes aid reflective surfaces of the mirrors are within a housing (not shown in FIG. 3) forming a hermetically sealed enclosure. This enclosure is filled with a lasing gas mixture, part of which, of course, is found between the electrodes. The electrodes are separated by a small distance D which, for a typical slab $CO_2$ laser is about 0.1 inch. The resonator and electrodes in the enclosure are usually referred to by practitioners of the art as the laser head.

Wall-plug AC power is provided to a DC power supply (DCPS) 32 which has an output voltage which is variable according to a voltage which is applied to a voltage control terminal 33. Such DC power supplies are commercially available. Pin 33 therein is usually referred to as the "output margin pin". One such DCPS is Model FXC6000 available from Power One Inc, of Camarillo, Calif. The output adjustment voltage range of the FXC6000 between 45.6 Volts (V) to 50.4V, which is a nominal output voltage of 48 V±2.4 V, i.e., ±5%. The open-circuit voltage of the output margin pin in this unit is 4.685 V DC. Reducing the voltage value on this pin below the open circuit voltage increases the output voltage of the DCPS, while increasing the voltage on the pin will decrease the output voltage of the DCPS which is delivered to the RFPS. The output voltage of DCPS 32 is provided to RFPS 30. The output power of RFPS 30 is delivered to electrode 22 via an impedance matching network 36 and will vary in proportion to the input DC voltage provided by the DCPS. The nominal output DC voltage of the above-exemplified DCPCS is 48V; as noted above. DCPSs having other than 48V output-voltage to accommodate RFPSs requiring other DC input voltages are also commercially available.

As noted above, RFPSs are usually designed by laser manufacturers. One reason for this is that the RFPS is, next to the laser head, the most important and costly subsystem of an RF-excited gas-discharge laser system. This is because the performance of the laser is closely connected to the performance of the RFPS. Such an RFPS typically includes an RF oscillator, the output of which is amplified by a plurality of amplifier stages. Each of the amplifier stages is powered by the DC voltage from the DCPS. Varying the voltage from the DCPS varies the output (gain) of each of the amplifier stages, and, accordingly the combined gain of all of the stages and the total output of the RFPS. Laser output is turned on and off by turning on and off one of the amplifier stages (usually the first) in the RFPS in response to user input commands delivered thereto via a terminal 31.

Continuing with reference to FIG. 3, ground electrode 24 of laser 10 has a temperature sensor 34, preferably a RF shielded thermistor, embedded therein. The purpose of the temperature sensor is to provide a measure of the temperature of the discharge gas 28 between the electrodes. The temperature sensor is preferably located as closely as practically possible to the electrode surface in contact with the discharge. This minimizes thermal delay between the surface and the temperature sensor and maximizes the speed of response of the temperature sensor to changes in the discharge temperature. A preferred distance d between the temperature sensor and the electrode surface is about 1/16 of an inch.

Figure 3A:
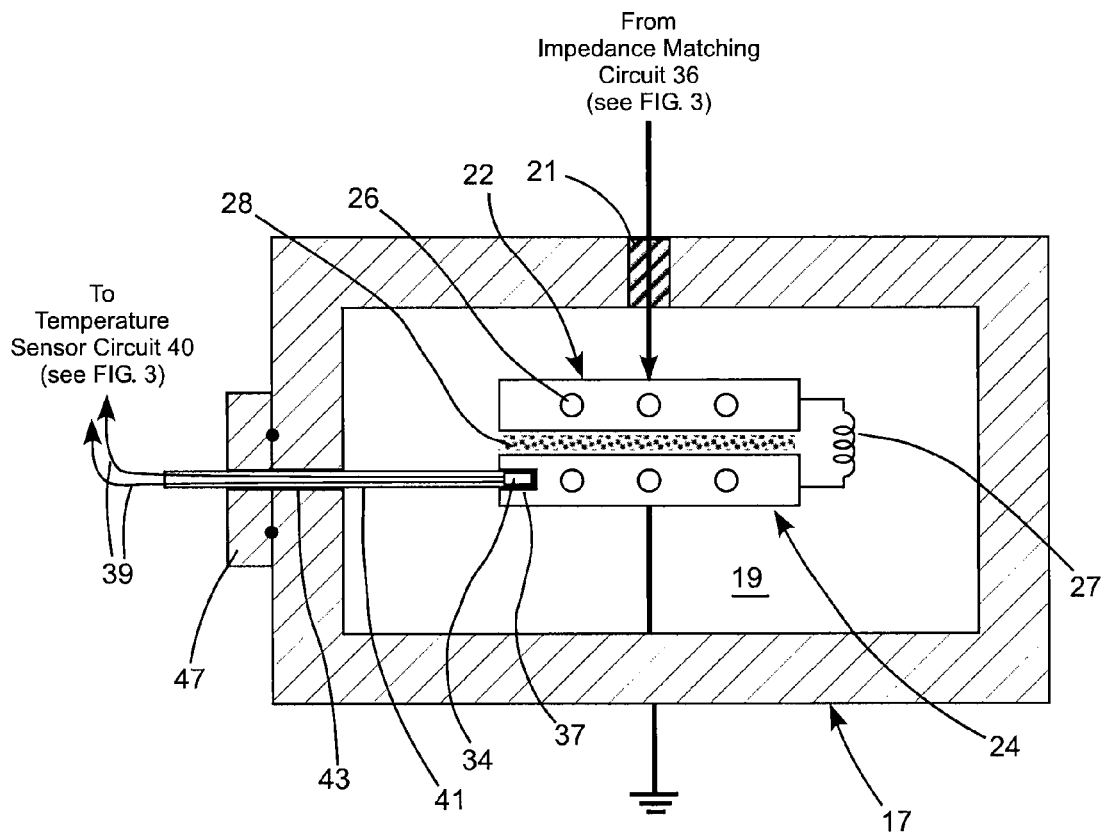
FIG. 3A is a lateral cross-section view schematically illustrating details of a laser housing for the electrodes of the laser apparatus FIG. 3 with details of a preferred configuration of the sensor providing RF shielding therefor.

Temperature sensor 34 preferably should be non-mechanical, for long life, and preferably should measure the discharge temperature as directly as possible. The temperature sensor should have a reasonably fast response, for example, a few seconds or less. The sensor should be rugged, small (to fit in the electrode) and preferably inexpensive. A thermistor satisfies these criteria. In particular, the temperature sensor should not be affected by spurious RF radiation from the electrodes. A description of an arrangement for mounting the sensor with RF shielding in laser apparatus in accordance with the present invention to provide RF shielding set forth below with reference to FIG. 3A.

Here, "hot" electrode 22 and ground electrode 24 of the laser are located in a housing 17 Forming a hermetically sealed enclosure 19 which contains the lasing gas mixture. The gas mixture in a $CO_2$ discharge laser is typically a mixture of $CO_2$, nitrogen ($N_2$) and helium (He) maintained at sub-atmospheric pressure usually between about 30 and 150 Torr. A ceramic hermetically sealed RF feed-through 21 is provided to enable the delivery of RF power to the hot electrode from RFPS 30, via impedance matching circuit 36. Inductors 27 are periodically distributed down the length of the electrodes to flatten out the voltage distribution along the length of the electrodes. The discharge is diffusion cooled by the two inside surfaces of the electrodes facing the discharge 28. The electrodes are cooled by coolant flowing within channels 26 drilled within the electrodes as discussed above with reference to FIG. 3.

Thermistor 34 is located in a small hole 37 drilled just below the surface of the ground electrode that is in contact with the discharge. The thermistor and electrical leads 39 thereof are contained within a stainless steel tube 41 having an outside diameter (OD) of about 1/8 of an inch. The stainless steel tube is compatible with the partial vacuum, the high RF electric fields that exist around the electrodes and the temperature environment existing within the gas laser housing. A suitable thermistor sensor already contained within a small diameter stainless steel tube having an OD of about 1/8 inches is available as Model TH10-44006-18-40 from OMEGA Engineering Inc., of Stamford, Conn.

The stainless steel tube is inserted through an aperture 43 in the laser housing such that the tube is in contact with the electrically grounded wall of the metal housing. The tube is held in place by a metal flange 47 bolted and sealed onto the side of the housing (bolts are not shown in FIG. 3A for simplicity of illustration). The output (signal) of the thermistor is directed via leads 39 to temperature sensor circuitry 40 (see FIG. 3).

Continuing now with reference to FIG. 3, the signal from the thermistor is processed by circuitry 40, which provides a voltage signal representative of the discharge temperature to output voltage change pin 33 of DCPS 32. The output power of RFPS 30 changes in response to the output voltage change of DCPS 32. This provides a means of controlling RF power delivered to the electrodes according to the monitored temperature of the discharge. Processing of the signal by circuitry 40 is arranged such that output power of the laser stays at about the steady-state value at any discharge temperature, as discussed below with reference to FIGS. 4A, 4B, 4C, and 4D.

It should be noted here that RFPS 30 is preferably designed to operate in a saturated mode, as is common in the art, for maximum efficiency. If the DC power into the RFPS is reduced or increased by about the ±5% discussed above with reference to a preferred DCPS, the RFPS will operate in only a slightly less efficient, but still acceptable, saturated mode. Variations in the steady state power are best achieved by pulse width modulation. Pulse width modulation techniques are known in the art and detailed description of pulse width modulation is not necessary for understanding principles of the present invention. Accordingly a detailed discussion of pulse width modulation is not presented herein. One suitable method of pulse width modulation is described in U.S. patent application Ser. No. 12/749,781, filed Mar. 30, 2010, assigned to the assignee of the present invention and the complete disclosure of which is hereby incorporated herein by reference.

Figure 4A:
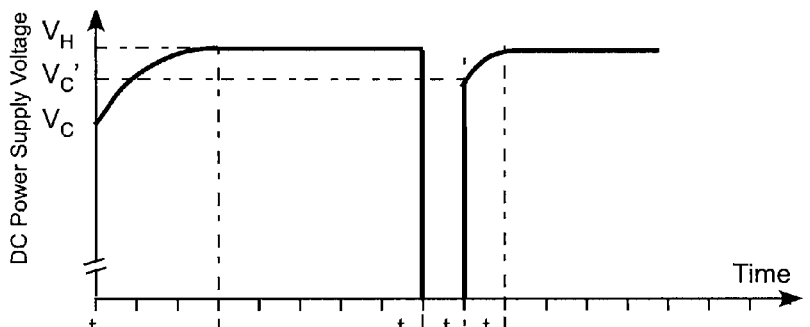
FIG. 4A, FIG. 4B, FIG. 4C, and FIG. 4D are graphs of DC power supply voltage, RF power to the electrodes, laser output power, and changes in gas temperature in the discharge, respectively, as a function of time, schematically illustrating an operating method of the apparatus of FIG. 3.
Figure 4B:
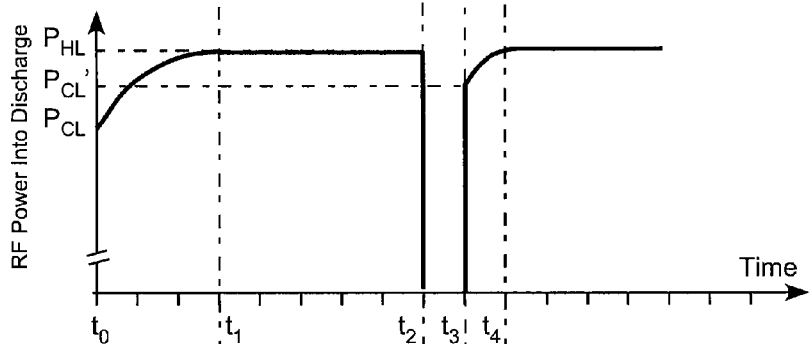
Figure 4C:
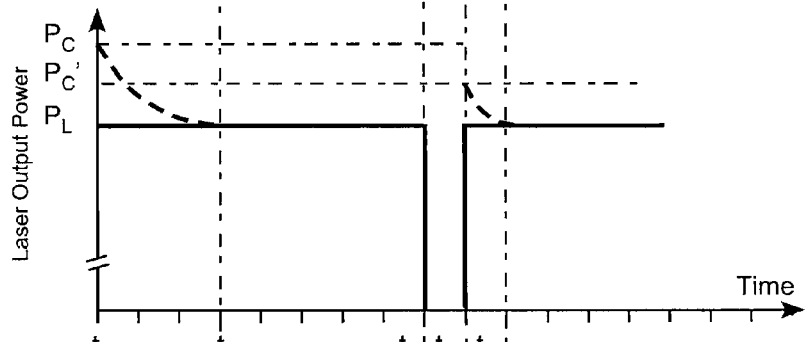
Figure 4D:
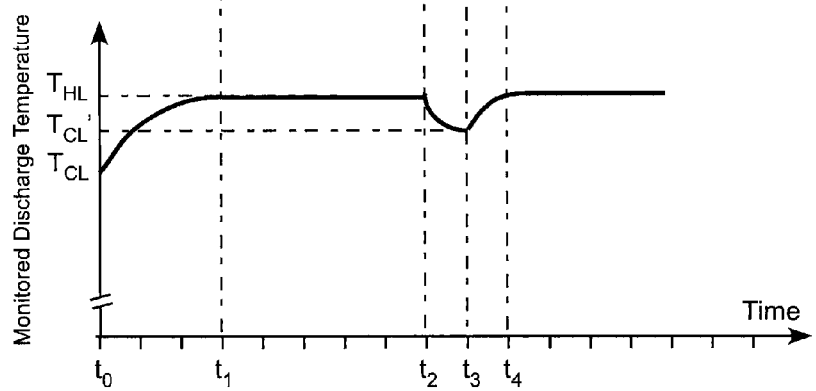

FIG. 4A is a graph schematically illustrating DC output voltage of the DCPS 32 as a function of time, beginning at time $t_0$ following an inactivity period of laser 10 of FIG. 3. FIG. 4B is є graph schematically illustrating the output power of RFPS 30 as a function of time corresponding to the DC voltage of FIG. 4A. Corresponding laser output power as a function of time is schematically depicted in FIG. 4C. Monitored discharge temperature as a function of time is schematically depicted in FIG. 4D. A signal specifying a required increase or decrease in the DCPS output voltage to the RFPS is provided by a temperature sensor circuit 40 corresponding to the temperature changes in the discharge. The output voltage at steady state operation is designated as $V_H$ corresponding to an RF power into the discharge of $P_{HL}$.

At start up ($t_0$), the DC voltage output of DCPS 32 starts at a lower voltage designated $V_C$ in FIG. 4A and increases to steady state value $V_H$ at time $t_1$ corresponding to the increase in discharge temperature from $T_{CL}$ to $T_{HL}$. The DC voltage change is in inverse proportion to a decrease in the laser output power from $P_C$ to $P_L$ that would occur in the absence of the voltage variation (see FIG. 2C) and is indicated in FIG. 4C by a dashed curve. At time $t_2$ RF power to the discharge is discontinued in response to a user command and lasing power output ceases. The discharge temperature begins to fall from temperature $T_{HL}$ (see FIG. 4D). At time $t_3$ RF power delivery is resumed and lasing starts. The inactivity interval $t_3$-$t_2$, here is assumed to be shorter that the inactivity interval prior to time $t_0$ such that time $t_3$ the discharge temperature is at a value $T_{CL}'$ higher than $T_C$. RF power delivery restarts at a higher power $P_{CL}'$ than $P_{CL}$ and corresponding to DC voltage $V_C'$, which corresponds, in turn to the higher discharge temperature at time $t_3$ than at time $t_0$. The RF power reaches value $P_{HL}$ at time $t_4$, when the discharge temperature reaches steady state value $T_{HL}$. The laser output power drop (from value $P_C'$) that would have occurred had RF power delivery resumed at value $P_{HL}$ is indicated by a dashed line in FIG. 4C. The inventive method illustrated by FIGS. 4A-D essentially eliminates the occurrence of the higher-than-steady-state power peaks on start-up, which are an unwanted feature of prior-art lasers. The term "essentially", as used here, means within a normal range of random fluctuations that could occur in steady-state output.

Figure 5:
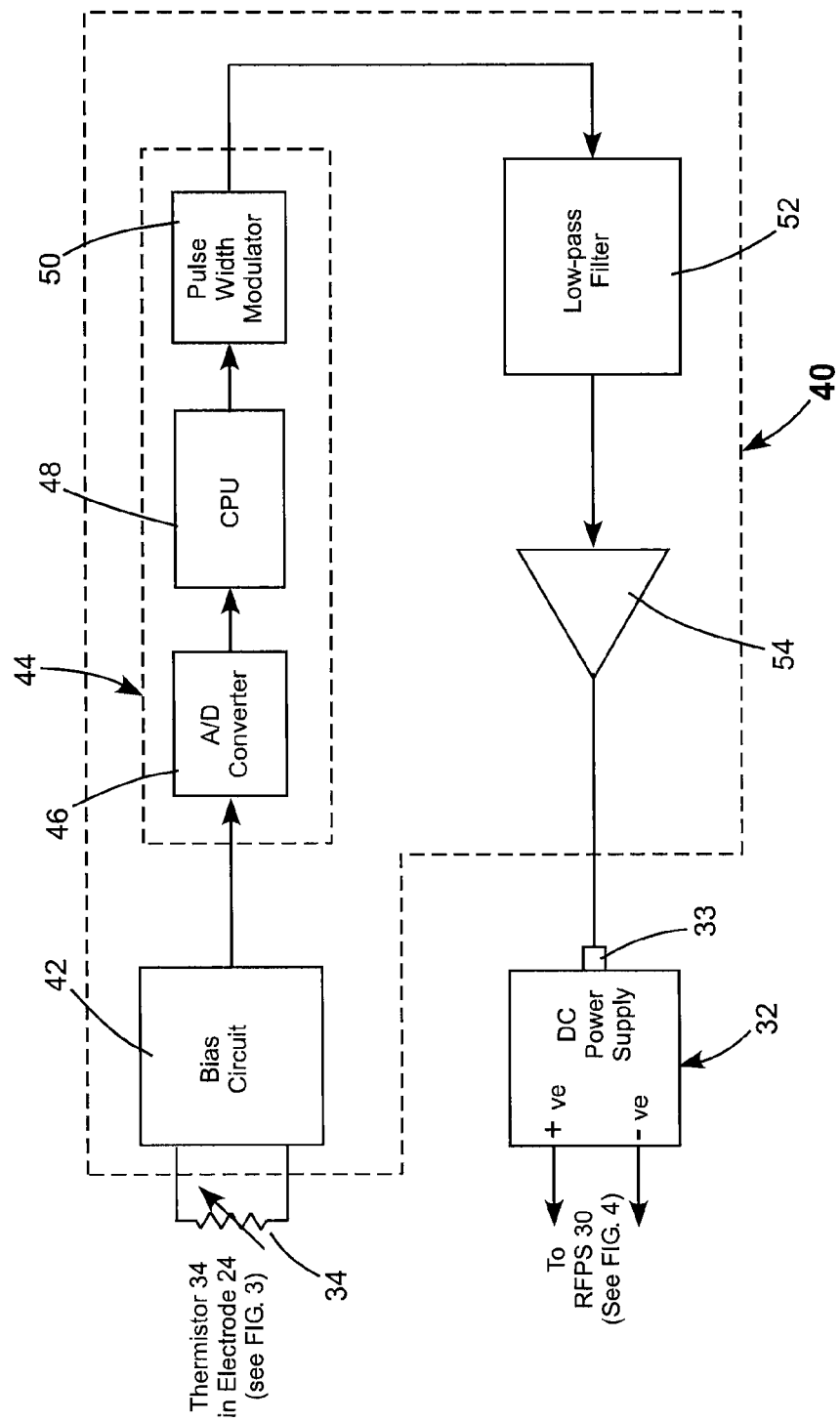
FIG. 5 is a circuit diagram schematically illustrating a preferred configuration of the temperature sensor electronics of FIG. 3

FIG. 5 schematically illustrates a preferred configuration of temperature monitoring circuitry 40 in laser 10 of FIG. 3. The voltage from thermistor 34 in electrode 24 of laser 10 varies, corresponding to the resistance of the thermistor as a function of the temperature close to the surface of the ground electrode, which is reasonable measure of the discharge (lasing gas) temperature. This voltage signal is provided by a standard bias circuit 42 to the input of a microcontroller 44. One suitable microcontroller is a model PIC18F4480, available from Microchip Inc., of Chandler, Ariz.

The bias circuit applies a DC voltage to the thermistor connected in series with a temperature-stable resistor therein. This provides that the voltage drop across the thermistor is a function of the temperature of the thermistor. The detected voltage signal correlates directly with the temperature of the thermistor. An analog to digital converter (A/D converter) 46 within the microcontroller takes an analog voltage signal from bias circuit 42 and converts the analog voltage signal to a digital signal. This digital signal is then provided to a central processing unit 48 within the microcontroller. The digital output from the CPU is provided to a pulse width modulator (PWM) 50 also within the microcontroller. The purpose of the PWM is to convert the digital signal from the CPU to an analog signal in conjunction with a low pass filter 52. The purpose of low pass filter 52 is to filter unwanted higher frequency noise to improve the signal to noise of the analog signal from the PWM. This filtered analog signal is passed through a buffer DC amplifier 54. The output of amplifier 54 is provided to voltage adjustment pin 33 of the DCPS 32 of laser 10 (see FIG. 3). Those skilled in the art will recognize that CPU 48 is programmed with appropriate calibration data such that the signal delivered to the DCPS changes the DCPS output to the RFPS output to compensate for gas temperature changes as discussed above.

Figure 6:
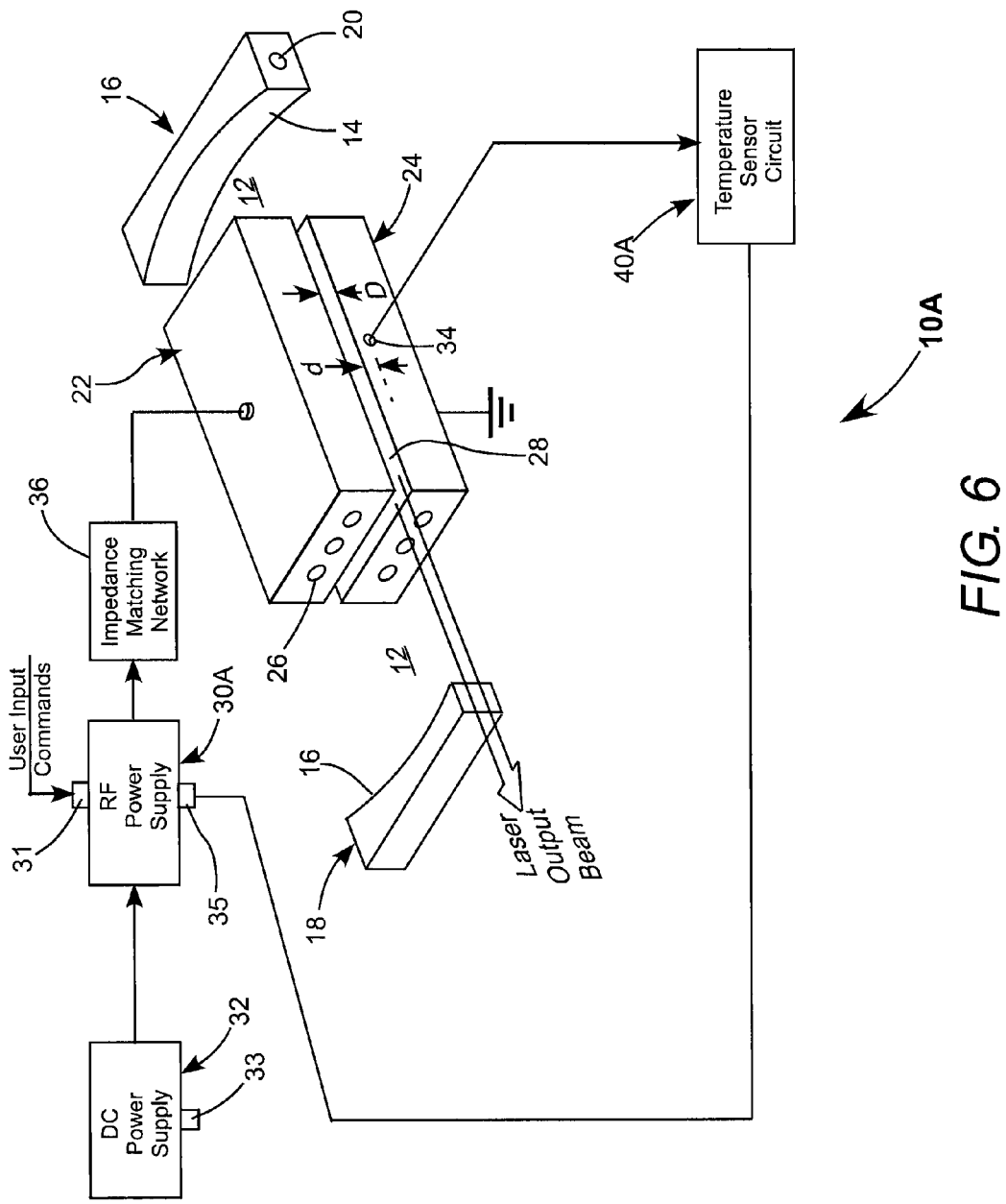
FIG. 6 schematically illustrates another preferred embodiment of gas discharge laser apparatus in accordance with the present invention similar to the apparatus of FIG. 3 but wherein the temperature sensor electronics are cooperative directly with the RF power supply for varying the output thereof.

FIG. 6 schematically illustrates another preferred embodiment 10A of gas discharge laser apparatus in accordance with the present invention. Laser 10A is similar to laser 10 of FIG. 3 with an exception that in laser 10A the RFPS (designated as RFPS 30A in FIG. 6) is controlled directly by temperature sensor circuitry 40A (designated as circuitry 40A in FIG. 6) via an input terminal (pin) 35 on the RFPS. RF power output is varied responsive to the input signal from circuitry 40A by directly varying the amplification of only one amplifier stage the RFPS. Means for doing this are describe hereinbelow with reference to FIGS. 7A and 7B.

RFPS 30A (unlike RFPS 30 of laser 10) is configured to respond to the control by circuitry 40A and accordingly is designated by a different reference numeral. Similarly circuitry 40A is programmed differently from circuitry 40 of laser 10 to take into account that the DCPS is no longer in the loop, and, for this reason, is also designated by a different reference numeral. DCPS 32 in lasers 10 and 10A can be the same. Laser 10A operates according to the scheme depicted in FIGS. 4B, 4C and 4D, here, with the RF power to the electrodes being directly varied as described above.

Figure 7A:
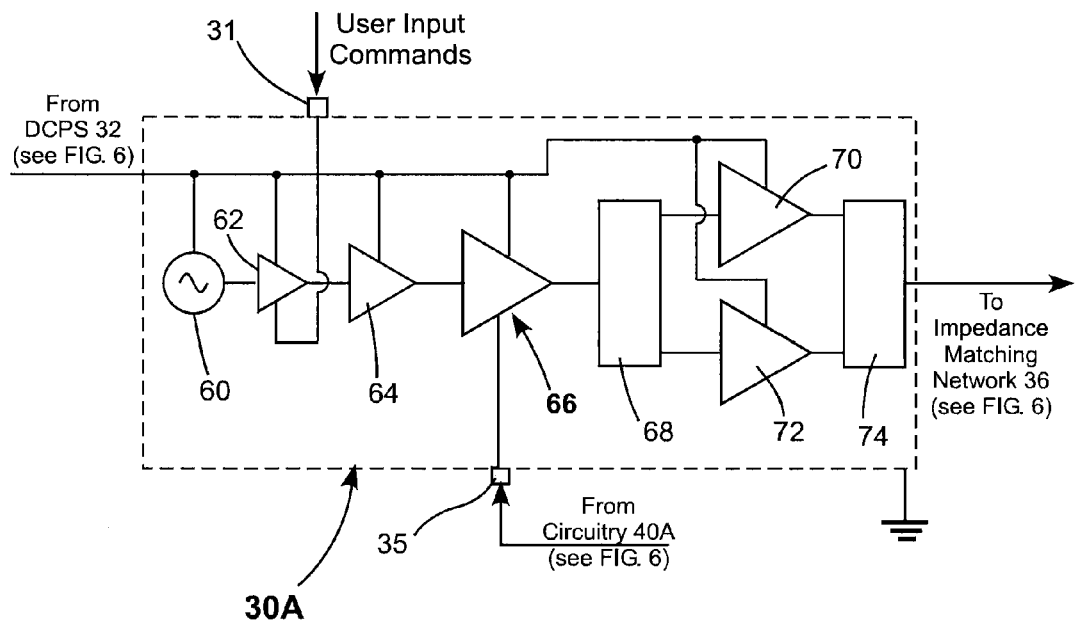
FIG. 7A is a circuit diagram schematically illustrating an example of a configuration of the RF power supply of FIG. 6 including first, second, and third amplification stages in series with the third stage connected to the temperature sensor electronics for varying the amplification of that stage according to the temperature monitored by the temperature sensor.
Figure 7B:
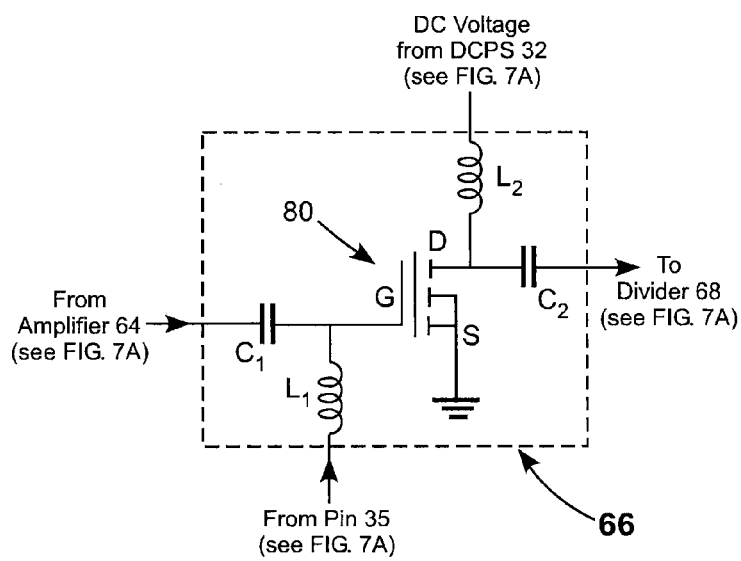
FIG. 7B is circuit diagram schematically illustrating a preferred configuration of the third amplification stage of FIG. 7A.

FIG. 7A and FIG. 7B are circuit diagrams schematically illustrating a preferred configuration of RFPS 30A. Referring first to FIG. 7A, RFPS 30A includes an RF oscillator 60. Oscillator 60 sets the RF frequency output of the RFPS. The output of the oscillator is delivered to a pre-amplifier 62 followed by one or more driver amplifiers 64 (only one thereof depicted in FIG. 7A) which amplify the RF signal from the oscillator to a power of about 3.5 W. A power driver amplifier 66 amplifies the signal from amplifier(s) 64 to a power of about 50 W. The 50 W signal from power amplifier 66 is split by a standard Wilkinson power divider 68. One of each of two signals out of the power divider is delivered to power amplifiers 70 and 72. All of the amplifiers are powered by DC voltage from DCPS 32. The amplified signals from amplifiers 70 and 72 signals are combined by a combiner 74 at a common node and delivered by a single transmission line, via impedance matching network 36, to laser electrodes as depicted in FIG. 6 (and also in FIG. 3).

If higher RF power is desired than is available from the combined output of amplifiers 70 and 72, the output of amplifiers 70 and 72 can be further divided and amplified before recombination. However many times the power is divided, amplification channels are combined by one or more RF power combiners to a common node for delivery to the electrodes. A detailed description of power division, amplification, and recombination is not necessary for understanding principles of the present invention and accordingly is not presented herein. A detailed description of schemes for such division, amplification, and recombination is provided in US Pre-Grant publication No. 2008/0204134, assigned to the assignee of the present invention, and the complete disclosure of which is hereby incorporated herein by reference.

All amplifier stages are powered by a (fixed) DC voltage from DCPS 32. The RFPS is turned off and on in response to user commands by switching the gain of amplifier stage 62 to zero and then back to a normal level.

In RFPS 30A, contrary to prior-art RFPSs, the net amplification is made variable in response to in externally supplied command by varying the gain of a single amplifier stage. Varying the gain of one of the stages, of course, varies the gain of all of the stages. In RFPS 30A this is accomplished by varying the amplification of power amplifier 66, which is the last amplifier stage before power division occurs. A description of one preferred arrangement for accomplishing this is set forth below with reference to FIG. 7B.

Here, power amplifier 66 includes a DC blocking capacitor $C_1$, an RF blocking inductor $L_1$, a field effect transistor (FET) 80, another RF blocking inductor L2, and another DC blocking capacitor $C_2$. FET 80 is preferably a laterally diffused metal-oxide-semiconductor FET (LDMOSFET). One suitable LDMOSFET is a model L2701 available from Polyfet Inc. of Camarillo, Calif. Other forms of power MOSFETs can also be used in place of this LDMOSFET device without departing from the spirit and scope of the present invention.

An RF signal from amplifier 64 is provided to the gate of the FET 80 via DC blocking capacitor $C_1$. In order to vary the amplification (gain) of amplifier 66, the signal from temperature sensor electronics 40A of laser 10A of FIG. 6 (input into RFPS 30A via pin 35) is connected to gate G of FET 80 via RF blocking inductor $L_1$. DC voltage from the DCPS is provided to the drain D of FET 80 via an RF blocking inductor $L_2$. Source S of the FET is grounded. Variation of the signal from sensor electronics 40A applied to the gate of FET 80 varies the peak RF output power of the FET. The varied RF output of the FET is delivered to divider 68 via a DC blocking capacitor $C_2$. This output is propagated through the remaining stages of amplification thereby, changing the combined amplification of all stages in the RFPS and accordingly the output RF power of the RFPS. A similar arrangement is used for switching amplifier stage 62 off and on.

Figure 1:
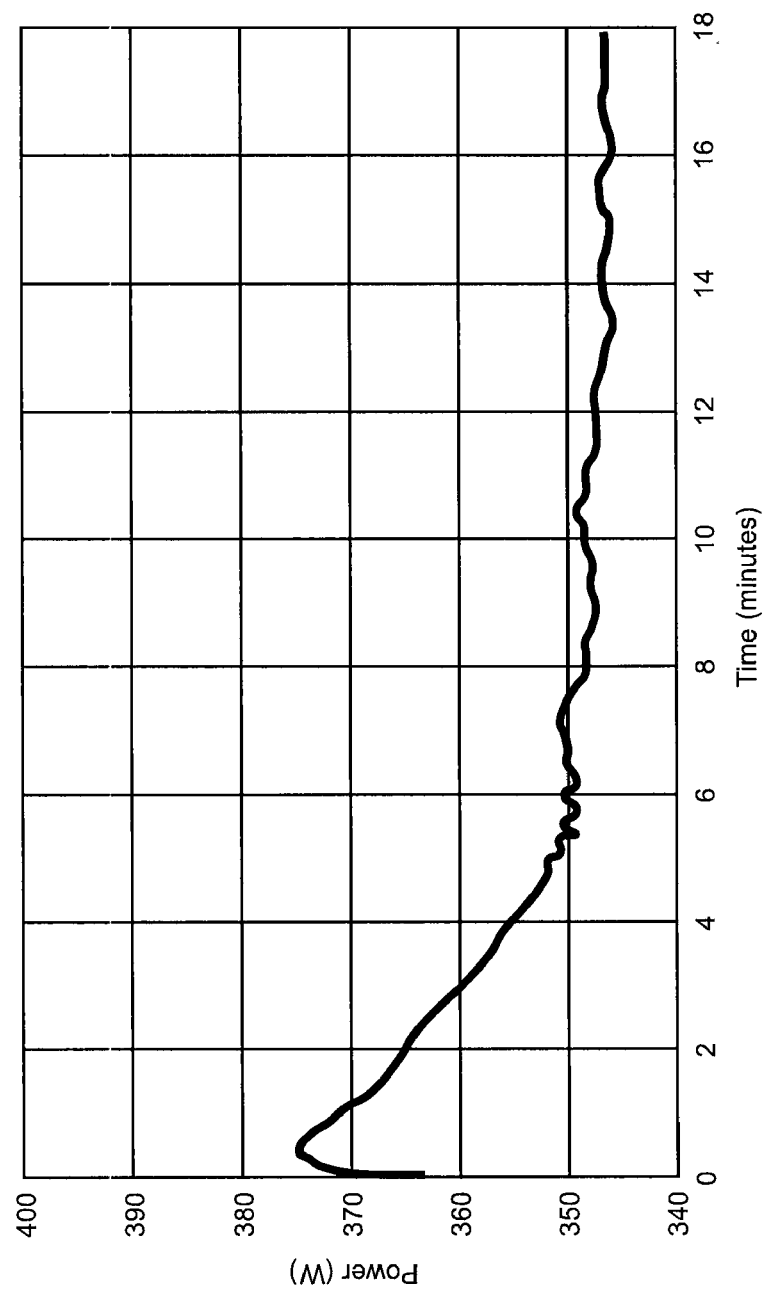
FIG. 1 is a graph schematically illustrating measured output power as a function of time for a prior-art pulsed RF-excited slab $CO_2$ laser after the laser has been inactive of a short time period, with the graph illustrating a power output immediately after turn on that is higher than an eventually-reached steady state value.
Figure 2A:
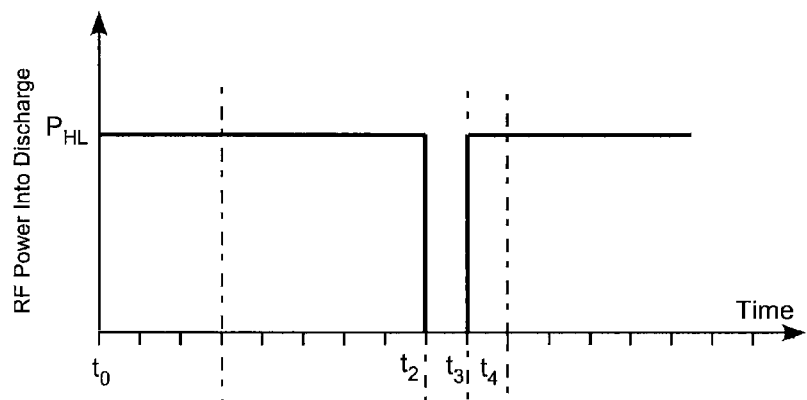
FIG. 2A, FIG. 2B, and FIG. 2C are graphs of RF power, discharge temperature, and laser output power, respectively, as a function of time, schematically illustrating a probable explanation for the measured higher-than-steady-state output power immediately after turn depicted in he graph of FIG. 1.
Figure 2B:
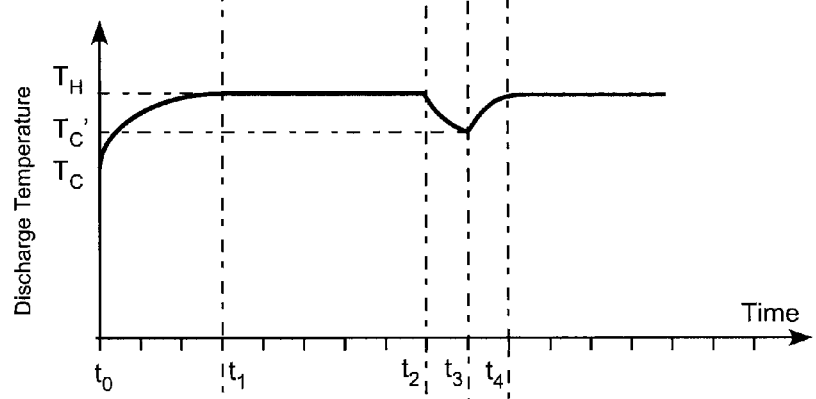
Figure 2C:
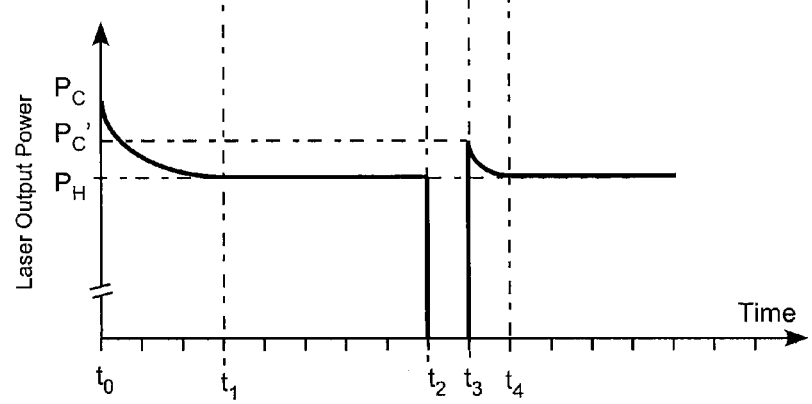

One skilled in the art could envision various other ways to vary the RF power delivered to the laser in response to the temperature measurements that would fall within the scope of the subject invention. For example, many RF lasers are operated in pulsed fashion, wherein a train of RF pulses (envelopes containing the RF signals) are delivered to the laser, each RF pulse generating a laser output pulse. Variations in the duty cycle (pulse on time divided by the sum of the pulse on time and off time) will change the average RF power delivered to the laser. In operation, when the laser is turned on after being turned off, the duty cycle can be temporarily reduced thereby temporarily reducing the average power delivered to the laser. In this manner, the problems of generating a higher power output at the start of operation as shown in FIG. 2C can be addressed so that a more uniform performance as shown in FIG. 4C can be achieved.

In conclusion, the present invention is described above with reference to two referred embodiments thereof. The invention is not limited, however, to the embodiments described and depicted. Rather the invention is limited only by the claims appended hereto.

What is claimed is:

1. A gas discharge laser comprising:
   a housing including spaced-apart electrodes and a lasing gas;
   a laser resonator extending between the spaced-apart electrodes;
   an RF power supply arranged to provide RF output power to the electrodes for creating a discharge in the lasing gas between the electrodes thereby causing laser output radiation to be delivered by the laser resonator, the power of the laser output radiation being directly dependent on the RF power provided to the electrodes;
   a temperature sensing element embedded in one of the discharge electrodes for measuring the temperature of the gas discharge between the spaced apart electrodes, the temperature sensing element generating a signal representative of the temperature of the gas discharge, the power of the laser output radiation being inversely dependent on the temperature of the gas discharge; and
   a circuit responsive to the gas discharge temperature signal to adjust the output power of the RF power supply responsive to changes in the gas discharge temperature such that the power of the output radiation is about constant.

2. The laser of claim 1, wherein the temperature sensing element is an RF shielded thermistor.

3. The laser of claim 1, wherein the RF power supply includes an RF oscillator the output of which is amplified by a plurality of amplifier stages the amplifier stages being powered by DC voltage output provided by a DC power supply.

4. The laser of claim 3, wherein the output power of the RF power supply is adjusted by adjusting the combined gain of the plurality of amplifier stages therein.

5. The laser of claim 4, wherein the combined gain of amplifiers in the RF power supply is adjusted by adjusting the DC voltage output to the RF power supply responsive to the gas discharge temperature signal thereby, adjusting the gain of all of the amplifier stages in the RF power supply.

6. The laser of claim 4, wherein the DC power supply is arranged to provide a fixed DC voltage to the RF power supply, and the combined gain of amplifiers in the RF power supply is adjusted by adjusting the gain of only one of the amplifier stages in the RF power supply responsive to the gas discharge temperature signal.

7. The laser of claim 1, wherein one of the electrodes is grounded and the temperature sensing element is embedded in the grounded electrode.

8. A gas discharge laser comprising:
   a housing including spaced-apart electrodes and a lasing gas;
   a laser resonator extending between the spaced-apart electrodes;
   an RF power supply including an RF oscillator, the output of which is amplified by a plurality of amplifier stages for providing RF output power, the RF output power being provided to the electrodes for creating a discharge in the lasing gas between the electrodes thereby causing laser output radiation to be delivered by the laser resonator, the power of the laser output radiation being directly dependent on the RF power provided to the electrodes;
   a DC power supply arranged to provide DC voltage to the amplifier stages of the RF power supply for powering the amplifier stages;
   a temperature sensor embedded in one of the discharge electrodes for measuring the temperature of the gas discharge between the spaced apart electrodes, the temperature sensor for producing a signal representative of the temperature of the gas discharge, the power of the laser output radiation being inversely dependent on the temperature of the gas discharge; and
   a controller responsive to the gas discharge temperature signal for adjusting the combined gain of the amplifiers in the RF power supply responsive to changes in the gas discharge temperature, thereby adjusting the output power of the RF power supply such that the power of the output radiation is about constant.

9. The laser of claim 8, wherein the temperature sensor is an RF shielded thermistor.

10. The laser of claim 8, wherein, one of the electrodes is grounded and the RF shielded thermistor is embedded in the grounded electrode.

11. The laser of claim 8, wherein the gain of amplifiers in the RF power supply is adjusted by adjusting the DC voltage output to the RF power supply responsive to the gas discharge temperature signal thereby adjusting the gain of all of the amplifier stages in the RF power supply.

12. The laser of claim 8, wherein the DC power supply is arranged to provide a fixed DC voltage to the RF power supply, and the net gain of amplifiers in the RF power supply is adjusted by adjusting the gain of only one of the amplifier stages in the RF power supply responsive to the gas discharge temperature signal.

13. A method of operating an RF gas discharge laser, said laser including a housing, said laser further including a pair of electrodes and a lasing gas located within the housing, said laser further including an RF power supply for supplying RF power to the electrodes to excite the lasing gas to create a discharge between the electrodes, said method comprising the steps of:

monitoring the temperature of the gas discharge using a temperature sensor embedded in one of the electrodes for measuring the temperature of the gas discharge between the pair of electrodes; and adjusting the level of RF power supplied to the electrodes in response to the monitored temperature in a manner to reduce fluctuations in output power.

14. A method as recited in claim 13, wherein the RF power supply includes an amplifier stage powered by a DC power supply and wherein the level of RF power supplied to the electrodes is adjusted by varying the gain of the amplifier stage.

15. A method as recited in claim 13, wherein the RF power supply includes an amplifier stage powered by a DC power supply and wherein the level of RF power supplied to the electrodes is adjusted by varying the level of DC power supplied to the amplifier stage.

16. The method of claim 13, wherein one of the electrodes of the pair of electrodes is grounded and the temperature sensor is embedded in the grounded electrode.

\* \* \* \* \*